United States Patent Office 3,501,477
Patented Mar. 17, 1970

3,501,477
SUBSTITUTED 1 - (4 - METHOXYBENZYL)-2-METHYL-1,2,3,4-TETRAHYDROISOQUINOLINES
Guenter Grethe, Cedar Grove, N.J., assignor to Hoffmann-La Roche Inc., Nutley, N.J., a corporation of New Jersey
No Drawing. Filed Mar. 29, 1967, Ser. No. 626,696
Int. Cl. C07d 35/10
U.S. Cl. 260—286          6 Claims

ABSTRACT OF THE DISCLOSURE

Process for the preparation of novel 1-(4-methoxybenzyl)-8-R-7-methoxy - 2 - methyl - 1,2,3,4 - tetrahydroisoquinolines (R=hydroxy or benzyloxy) utilizing novel 8-benzyloxy-7-methoxy-2-methyl - 3,4 - dihydroisoquinolinium salts. The disclosed novel compounds are useful as sequential intermediates for the preparation of petaline, a natural product of known pharmacological activity.

Brief summary of the invention

The invention relates to the following novel compounds: 8-benzyloxy-7-methoxy-2-methyl - 3,4 - dihydroisoquinolinium salts, 1-(4-methoxybenzyl) - 8 - benzyloxy-7-methoxy-2-methyl - 1,2,3,4 - tetrahydroisoquinoline and 1-(4-methoxybenzyl-8-hydroxy-7-methoxy-2-methyl-1,2,3,4-tetrahydroisoquinoline. The 1,2,3,4-tetrahydroisoquinolines mentioned above are prepared from the novel 8-benzyloxy-7-methoxy-2-methyl - 3,4 - dihydroisoquinolinium salts. The novel compounds of the invention are useful as sequential intermediates for the preparation of petaline, a natural product of known pharmacological activity.

Detailed description

The process of this invention and the novel compounds produced thereby can be illustratively represented by the following formulas:

The compound of Formula II is 8-benzyloxy-7-methoxy-2-methyl-3,4-dihydroisoquinolinium ⊕X⊖, wherein X is the anion of an inorganic acid, such as perchloric acid, hydrochloric acid, hydrobromic acid, hydroiodic acid and the like. The compound of Formula III is 1-(4-methoxybenzyl)-8-benzyloxy-7-methoxy-2 - methyl 1 1,2,3,4-tetrahydroisoquinoline. The compound of Formula IV is racemic 1-(4-methoxybenzyl)-8-hydroxy-7-methoxy - 2 - methyl-1,2,3,4-tetrahydroisoquinoline.

The isoquinoline represented by Formula I is a novel compound disclosed and claimed in a U.S. patent application Ser. No. 626,695 filed May 29, 1967 by G. Grethe and F. Schenker. Its preparation is described in detail hereinafter in Example 1.

In carrying out the process of the invention, the compound of Formula I is reacted with mercuric acetate and subsequently with an inorganic acid, such as perchloric acid, hydrochloric acid, hydrobromic acid, hydroiodic acid or the like to yield a compound of Formula II, which is isolated and purified as a crystalline salt. Thereafter, the compound of Formula II is reacted with a Grignard reagent of 4-methoxybenzyl chloride, to yield the isoquinoline derivative of Formula III. The conversion to the isoquinolinol of Formula IV is conveniently effected by hydrogenation of the compound of Formula III utilizing a palladium-on-carbon catalyst.

The novel compounds of Formulas II, III and IV are particularly useful as sequential intermediates in the preparation of petaline, a compound of known pharmacological activity. [J. McShefferty et al., J. Pharm. and Pharmacol. 8: 1117–1132 (1956)]. The compounds of this invention have been described by Grethe et al., Tetrahedron Letters, No. 15, 1599–1603, April 1966.

The preparation of petaline by sequential utilization of the compounds of Formulas II, III and IV can be illustratively represented by the following reaction sequence:

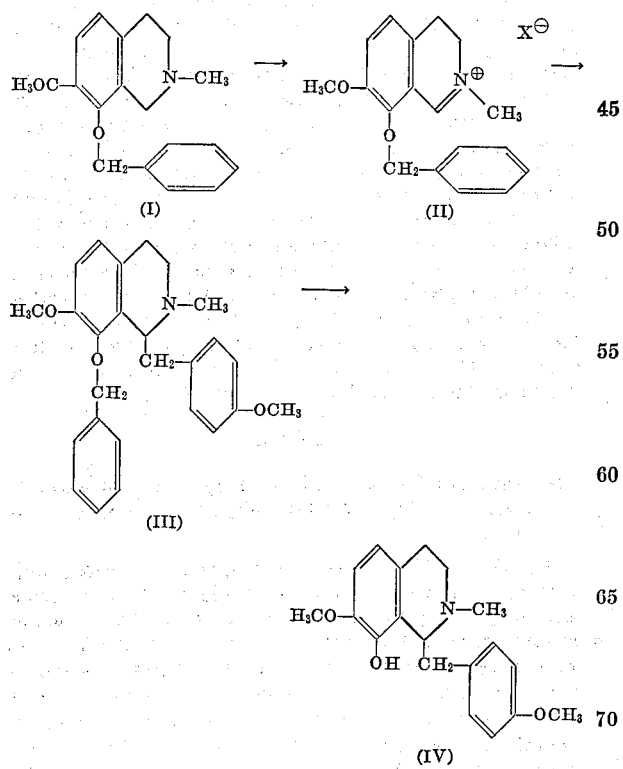

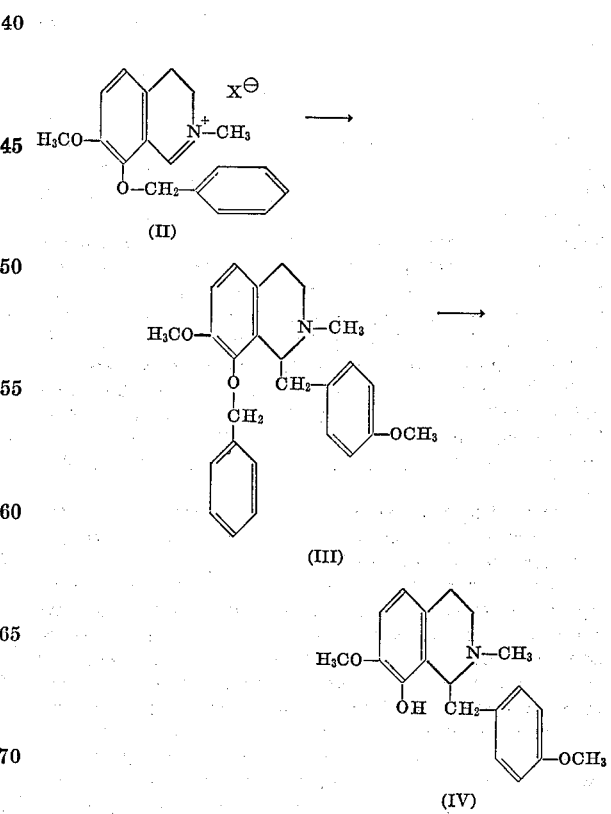

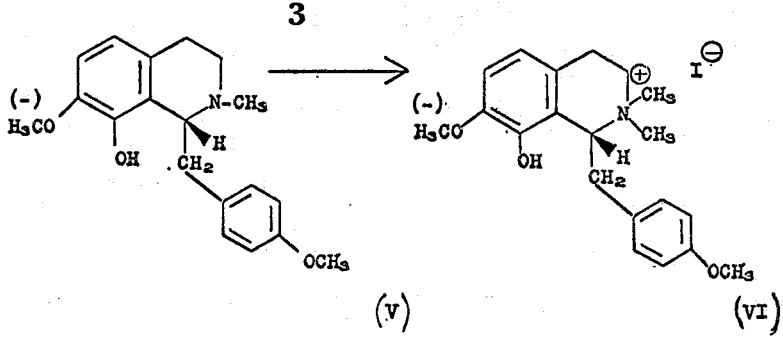

The compound of Formula V is the optical active (—)-1-(4-methoxybenzyl) - 8 - hydroxy-7-methoxy-2-methyl-1,2,3,4-tetrahydroisoquinoline, obtained from the racemic compound of Formula IV.

The resolution of the racemic compound of Formula IV to the compound of Formula V is conveniently accomplished utilizing dibenzoyl-d-tartaric acid. By subsequent conversion of the dibenzoyl-d-tartarate salt of the compound of Formula V to the free base and reaction thereof with methyl iodide, the known (—) petaline iodide is obtained.

The following non-limiting examples further illustrate the invention. All parts are by weight and all temperatures are in degrees centigrade, unless otherwise mentioned.

EXAMPLE 1

Preparation of 8-benzyloxy-7-methoxy-2-methyl-3,4-dihydroisoquinolinium perchlorate To a solution of 13.4 g. (0.042 mole) of 8-benzyloxy-7-methoxy-2-methyl-1,2,3,4-tetrahydroisoquinoline hydrochloride in methanol were added 95 ml. of ethanolic sodium ethoxide solution containing 2.84 g. (0.042 mole) of sodium ethoxide. The solvents were removed under reduced pressure, and the residue suspended in 100 ml. of methylene chloride. The insoluble matter was removed by filtration, and the filtrate was evaporated to dryness under reduced pressure. The oily residue was dissolved in 240 ml. of 10% aqueous acetic acid and a solution of 53.5 g. (0.168 mole) of mercuric acetate in 240 ml. of 10% aqueous acetic acid was added. The mixture was stirred at 75° in a nitrogen atmosphere for 40 hours. After cooling to 50°, the precipitated mercurous acetate was removed by filtration and hydrogen sulfide was passed through the warm filtrate for 15 minutes. The black precipitate which formed was removed by filtration, and the filtrate was evaporated to dryness under reduced pressure. The oily residue was dissolved in methanol. An excess amount of isopropanolic hydrogen chloride and acetone were added to the solution, and the mixture was allowed to stand in the refrigerator overnight. The precipitate was removed by filtration. The filtrate was evaporated to dryness under reduced pressure and the residue was dissolved in water. Addition of excess 70% aqueous perchloric acid to the solution gave a yellow precipitate, which was collected by filtration. Recrystallization from methanol gave 8.3 g. (43%) of 8-benzyloxy-7-methoxy-2-methyl-3,4-dihydroisoquinolinium perchlorate, M.P. 178–180°. Upon recrystallization from methanol, the product had a M.P. of 181–183°.

The starting material 8-benzyloxy-7-methoxy-2-methyl-1,2,3,4-tetrahydroisoquinoline hydrochloride of Example 1 is prepared as follows:

To a solution of 21.57 g. (0.1 mole) of 1,2,3,4-tetrahydro-7-methoxy-8-isoquinolinol hydrochloride in two liters of methanol were added 227 ml. of an ethanolic sodium ethoxide solution containing 6.8 g. (0.1 mole) of sodium ethoxide. The solvent was removed under reduced pressure and the solid residue was suspended in 800 ml. of a mixture of ethanol-methylene chloride (1:1). After stirring for 30 minutes under nitrogen, the insoluble matter was removed by filtration under nitrogen, and the filtrate was evaporated to dryness under reduced pressure. The solid free base thus obtained was added to a stirred mixture of 40 ml. of formic acid (98–100%) and 30 ml. of triethylamine. After completion of the addition, the mixture was stirred at 100–110° overnight and then evaporated to ca. 40–50 ml. of volume under reduced pressure. Addition of water to the oily residue produced 15.9 g. of a crystalline precipitate, M.P. 175–177°. Recrystallization from methanol gave 13 g. (63%) of 2-formyl-1,2,3,4-tetrahydro-7-methoxy-8-isoquinolinol, M.P. 177–179°.

To a solution of 26.5 g. (0.128 mole) of 2-formyl-1,2,3,4-tetrahydro-7-methoxy-8-isoquinolinol in one liter of methanol were added 291 ml. of a solution of sodium ethoxide in ethanol containing 8.7 g. (0.128 mole) of sodium ethoxide. The mixture was allowed stand at room temperature for 1 hour and thereafter the solvent was removed under reduced pressure. In order to assure dryness of the solid residue, approximately 200 ml. of benzene were added to the residue and removed under reduced pressure. This procedure was repeated twice more. The dry residue was then suspended in 750 ml. of distilled dimethylformamide, and 147 ml. of benzyl chloride were added thereto. The mixture was stirred at 100° for 40 hours. After removing the solvents under a pressure of 1 mm., the residue was suspended in 400 ml. of benzene, and the insoluble parts were removed by filtration. The filtrate was evaporated to dryness under reduced pressure to give 37.4 g. of 8-benzyloxy-2-formyl-7-methoxy-1,2,3,4-tetrahydroisoquinoline as a brown oil, which was used for the next step without further purification.

To a cooled solution of 37.4 g. of crude 8-benzyloxy-2-formyl-7-methoxy-1,2,3,4-tetrahydroisoquinoline in 1.3 liters of freshly purified tetrahydrofuran were added cautiously 9.5 g. of lithium aluminum hydride in small portions through a wide-mouth polyethylene funnel. Upon completion of the addition, the mixture was refluxed with stirring overnight. To the cooled mixture was added dropwise a saturated aqueous solution of sodium sulfate until the hydrogen evolution ceased. After adding solid sodium sulfate the mixture was filtered and the filtrate evaporated to dryness under reduced pressure. The residue was dissolved in 100 ml. of methanol, and excess isopropanolic acid was added. Upon addition of ether to the solution a crysetalline precipitate was formed which was collected by filtration to give 23.5 g. (58%) of 8-benzyloxy-7-methoxy-2-methyl-1,2,3,4-tetrahydroisoquinoline hydrochloride, M.P. 185–188°. After recrystallization from methanol, the product had a M.P. of 191–192.5°.

EXAMPLE 2

Preparation of 1 - (4 - methoxybenzyl) - 8 - benzyloxy-7-methoxy-2-methyl-1,2,3,4,-tetrahydroisoquinoline hydrochloride To 56.5 g. (2.32 moles) of magnesium covered with 250 ml. of anhydrous ether were added 0.5 g. of iodine and 4 g. of p-methoxybenzyl chloride. The reaction started immediately. Without stirring, the mixture was kept at reflux temperature under a nitrogen atmosphere for 10 minutes. This was followed by the addition over a 30-minute period of a solution of 14.2 g. of p-methoxybenzyl chloride (18.2 g.; 0.116 mole) in 110 ml. of anhydrous ether to the vigorously stirred mixture. After the addition was completed, heating at reflux was continued for an additional 40 minutes. The mixture was cooled to room temperature and the solid parts were allowed to settle. The mixture was carefully filtered through a glass sintered funnel under slight nitrogen pressure. The filtrate was stirred in a nitrogen atmosphere and over a 15 minute period, 10 g. (0.022 mole) of 8-benzyloxy-7-methoxy-2-methyl-3,4-dihydroisoquinolinium perchlorate were added. After the addition was completed, the mixture was refluxed for 1 hour. Thereafter, the mixture was cooled to room temperature and 20 ml. of methanol were carefully added. The ethereal solution was decanted from the solid precipitate and addition of excess isopropanolic hydrogen chloride to the solution resulted in an oily precipitate which slowly crystallized on standing. The crystalline material was collected by filtration to give 6.3 g. of 1-(4-methoxybenzyl) - 8-benzyloxy - 7 - methoxy - 2 - methyl - 1,2,3,4-tetrahydroisoquinoline, M.P. 170–180°. The residue of the ether decantation was extracted several times with chloroform. The combined organic layers were washed three times with 3 N hydrochloric acid and successively with water, dried over sodium sulfate, filtered and evaporated to dryness under reduced pressure to give a brown oil. This was dissolved in methanol, and the resulting solution was treated with excess isopropanolic hydrogen chloride. Addition of ether to the mixture yielded 3.1 g. of crystalline material, M.P. 186–192°. Both crystalline fractions were combined and recrystallized from methanol-ether to give 6.2 g. (54%) of 1-(4-methoxybenzyl) - 8 - benzyloxy - 7 - methoxy - 2 - methyl - 1,2,3,4-tetrahydroisoquinoline hydrochloride, M.P. 194–195°.

EXAMPLE 3

Preparation of 1-(4-methoxybenzyl)-1,2,3,4-tetrahydro-7-methoxy-2-methyl-8-isoquinolinol maleate To a solution of 12.8 g. (0.029 mole) of 1-(4-methoxybenzyl) - 8 - benzyloxy-7-methoxy-2-methyl-1,2,3,4-tetrahydroisoquinoline hydrochloride in 650 ml. of glacial acetic acid were added 3 g. of 10% palladium-on-carbon and the mixture was hydrogenated at atmospheric pressure and a starting temperature of 70°. During the hydrogenation the temperature was allowed to cool down to room temperature. After 6 hours the hydrogen uptake ceased. The catalyst was removed by filtration, and the filtrate was evaporated to dryness under reduced pressure. The oily residue was dissolved in 100 ml. of water, the solution was mixed with 100 ml. of chloroform, and excess sodium bicarbonate was added to the vigorously stirred mixture. The chloroform solution was separated. The aqueous phase was washed twice with 100 ml. of chloroform each. The organic solutions were combined, washed with water, dried over sodium sulfate and evaporated to dryness under reduced pressure to give 10.7 g. of brown oil. To a solution of 1.72 g. of the oil in ether was added a solution of 0.7 g. of maleic acid in 50 ml. of ether. The solid precipitate which formed was collected by filtration, recrystallized from ethanol-ether to give 2 g. of 1 - (4 - methoxybenzyl)-1,2,3,4-tetrahydro-7-methoxy - 2-methyl-8-isoquinolinol maleate, M.P. 152–155° with softening at 80°. An analytical sample after recrystallization from ethanol-ether showed two melting points at 77–79° and 155°, respectively.

EXAMPLE 4

Preparation of (−)-1-(4-methoxybenzyl)-1,2,3,4-tetrahydro-7-methoxy-2-methyl-8-isoquinolinol dibenzoyl - d-tartarate Crude 1 - (4-methoxybenzyl)-1,2,3,4-tetrahydro-7-methoxy-2-methyl-8-isoquinolinol obtained from 3.7 g. of 1-(4 - methoxybenzyl)-8-benzyloxy-7-methoxy-2-methyl-1,2,3,4-tetrahydro-isoquinoline hydrochloride by hydrogenation, as described in the previous experiment, was dissolved in 100 ml. of ether. To the ethereal solution was added a solution of 3.3 g. of dibenzoyl-d-tartaric acid in 50 ml. of ether producing a colorless precipitate. The precipitated material was collected by filtration, thoroughly washed with ether, and subsequently dissolved in methanol. Part of the solvent was removed by distillation to a volume of 50 ml. The solution was allowed to cool to room temperature, and a crystalline product slowly precipitated. This was collected by filtration and recrystallized from methanol to give 0.685 g. of optical active (−)-1-(4-methoxybenzyl) - 1,2,3,4-tetrahydro-7-methoxy-2-methyl-8-isoquinolinol dibenzoyl-d-tartarate. An analytical sample was recrystallized several times from methanol and dried at 50° under vacuum for 100 hours, M.P. 191–192°.

(−) PETALINE IODIDE

To a solution of 281.5 mg. (0.286 mmole) of (−)-1-(4- methoxybenzyl)-1,2,3,4-tetrahydro-7-methoxy-2-methyl - 8 - isoquinolinol dibenzoyl-d-tartarate in 200 ml. of methanol were added 5.15 ml. of ethanol containing 38.85 mg. (0.572 mmole) of sodium ethoxide. The solvent was removed under reduced pressure and the residue was thoroughly extracted with ether. Removal of the ether under vacuum gave 162 mg. of the optical active tertiary free base, as light yellow, heavy oil $[\alpha]_D^{24.9} = -32.2°$ (c. 0.165, $CHCl_3$). The free base was dissolved in 20 ml. of anhydrous ether and a solution of 1 ml. of freshly distilled methyl iodide in 3 ml. of anhydrous ether was added over a period of 20 minutes. The mixture was allowed to stand at room temperature overnight. Thereafter, the precipitate was collected by filtration, washed with ether and dried to give 168 mg. of yellow amorphous (−) petaline iodide, M.P. 107–116°. An analytical sample of a previous run showed M.P. 108–113° after drying at 40° at a pressure of 0.1 mm. for 5 days. The spectral data of this compound were compatible with those of natural product.

The iodide was transformed into the amorphous reineckate, M.P. 135–145°, the IR of which was superimposable with that of natural product.

What is claimed is:

1. A compound selected from the group consisting of 1-(4-methoxybenzyl) - 8 - benzyloxy-7-methoxy-2-methyl-1,2,3,4-tetrahydroisoquinoline and 1-(4-methoxybenzyl)-8 - hydroxy-7-methoxy-2-methyl - 1,2,3,4 - tetrahydroisoquinoline.

2. A compound in accordance with claim 1, 1-(4-methoxy-benzyl) - 8 - benzyloxy-7-methoxy-2-methyl-1,2,3,4-tetrahydroisoquinoline.

3. A compound in accordance with claim 1, 1-(4-methoxybenzyl) - 8 - hydroxy-7-methoxy-2-methyl-1,2,3,4-tetrahydroisoquinoline.

4. A compound in accordance with claim 1, (−) 1-(4-methoxybenzyl) - 8 - hydroxy - 7-methoxy-2-methyl-1,2,3,4-tetrahydroisoquinoline.

5. The compound of the formula:

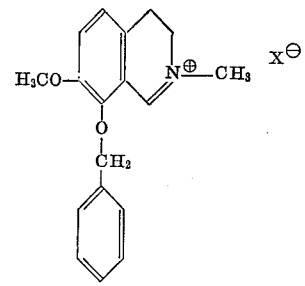

(II)

wherein $X^\ominus$ is the anion of an acid selected from the group consisting of perchloric acid, hydrobromic acid, hydrochloric acid, and hydroiodic acid.

6. A compound in accordance with claim 5, 8-benzyl-oxy - 7 - methoxy-2-methyl - 3,4 - dihydroisoquinolinium perchlorate.

References Cited

UNITED STATES PATENTS

| 2,663,709 | 12/1953 | Craig | 260—286 |
| 2,200,041 | 1/1955 | Weston et al. | 260—289 X |
| 3,217,007 | 11/1965 | Brossi et al. | 260—287 |

OTHER REFERENCES

Brossi et al.: Helv. Chem. Acta, vol. 47, pp. 2089–98 (1964).

Chem. Abstr., vol. 62, 61–600 (1965).

DONALD G. DAUS, Primary Examiner

U.S. Cl. X.R.

260—289, 999

UNITED STATES PATENT OFFICE
CERTIFICATE OF CORRECTION

Patent No. 3,501,477                              March 17, 1970

Guenter Grethe

It is certified that error appears in the above identified patent and that said Letters Patent are hereby corrected as shown below:

Column 7, line 7, "2,200,041" should read -- 2,700,041 --.

Signed and sealed this 16th day of March 1971.

(SEAL)
Attest:

Edward M. Fletcher, Jr.                      WILLIAM E. SCHUYLER, JR.
Attesting Officer                              Commissioner of Patents